United States Patent
Setlur et al.

(10) Patent No.: US 6,613,248 B2
(45) Date of Patent: Sep. 2, 2003

(54) QUANTUM-SPLITTING OXIDE-BASED PHOSPHORS AND METHOD OF PRODUCING THE SAME

(75) Inventors: Anant Achyut Setlur, Niskayuna, NY (US); Alok Mani Srivastava, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 132 days.

(21) Appl. No.: 09/681,670

(22) Filed: May 18, 2001

(65) Prior Publication Data

US 2002/0185960 A1 Dec. 12, 2002

(51) Int. Cl.$^7$ .......................... C09K 11/55; C09K 11/63; C09K 11/64
(52) U.S. Cl. ................. 252/301.4 R; 313/373; 313/486; 313/487; 313/467
(58) Field of Search ............... 252/301.4 R; 313/373, 313/486, 487, 467

(56) References Cited

U.S. PATENT DOCUMENTS

| | | | |
|---|---|---|---|
| 5,552,082 A | | 9/1996 | Srivastava et al. .... 252/301.4 R |
| 5,571,451 A | * | 11/1996 | Srivastava et al. .... 252/301.4 R |
| 5,788,883 A | * | 8/1998 | Srivastava et al. .... 252/301.4 R |
| 6,210,605 B1 | * | 4/2001 | Srivastava et al. .... 252/301.4 R |

OTHER PUBLICATIONS

R. Pappalardo, "Calculated Quantum Yields for Photon–Cascade Emission (PCE) for Pr3+ and Tm3+ in Fluoride Hosts," Journal of Luminescence, vol. 14, pp. 159–193 (1976).
W. W. Piper et al., "Cascade Fluorescent Decay in Pr3+–Doped Fluorides: Achievement of a Quantum Yield Greater than Unity for Emission of Visible Light," Journal of Luminescence, vol. 8, pp. 344–348 (1974).
J. L. Sommerdijk et al., "Two Photon Luminescence with Ultraviolet Excitation of Trivalent Praseodymium," Journal of Luminescence, vol. 8, pp. 341–343 (1974).

* cited by examiner

Primary Examiner—C. Melissa Koslow
(74) Attorney, Agent, or Firm—Toan P. Vo; Noreen C. Johnson

(57) ABSTRACT

Strontium, calcium, strontium calcium, strontium calcium magnesium, calcium magnesium aluminates, and strontium borates activated with $Pr^{3+}$ exhibit characteristics of quantum-splitting phosphors under VUV excitation. A large emission peak at about 405 nm under VUV excitation is used conveniently to identify quantum-splitting phosphors. Improvements may be achieved with addition of fluorides or boric acid as a flux during the preparation of the phosphors. It is also possible to predict improvement in quantum efficiency by observing the ratio of emission intensities at about 480 nm and about 610 nm.

25 Claims, 5 Drawing Sheets

QUANTUM-SPLITTING OXIDE-BASED PHOSPHORS AND METHOD OF PRODUCING THE SAME

CROSS REFERENCE TO RELATED APPLICATIONS

This patent application is related to patent applications Ser. No. 09/681,666 (Attorney Docket No. RD-28342), titled "Improved Quantum-Splitting Oxide-Based Phosphors, Methods of Producing, and Rules for Designing the Same," filed on May 18, 2001.

FEDERAL RESEARCH STATEMENT

This invention was first conceived or reduced to practice in the performance of work under a contract with the United States Department of Energy, said contract having the contract number of DE-FC26-99FT40632. The United States of America may have certain rights to this invention.

BACKGROUND OF INVENTION

Field of the Invention

This invention relates to oxide-based materials that have one application as phosphors. More particularly, the phosphors are aluminates or borates doped with $Pr^{3+}$ and exhibit quantum splitting when irradiated with vacuum ultraviolet ("VUV") radiation. This invention also relates to a method of making such quantum-splitting phosphors.

The conversion of a single ultraviolet ("UV") photon into two visible photons with the result that the quantum efficiency of luminescence exceeds unity is termed quantum splitting. Quantum splitting materials are very desirable for use as phosphors for lighting applications, such as fluorescent lamps. A suitable quantum splitting phosphor can, in principle, produce a significantly brighter fluorescent light source due to higher overall luminous output because it can convert to visible light the part of UV radiation that is not absorbed efficiently by traditional phosphors currently used in commercial fluorescent lamps. Quantum splitting has been demonstrated previously in fluoride- and oxide-based materials. A material comprising 0.1% $Pr^{3+}$ in a matrix of $YF_3$ has been shown to generate more than one visible photon for every absorbed UV photon when excited with radiation having a wavelength of 185 nm. The measured quantum efficiency of this material was 140%, and thus greatly exceeded unity. However, fluoride-based compounds do not have sufficient stability to permit their use as phosphors in fluorescent lamps because they are known to react with mercury vapor that is used in such lamps to provide the UV radiation and form materials that do not exhibit quantum splitting. In addition, producing fluoride-based materials presents a great practical challenge because it involves the use of large quantities of highly reactive and toxic fluorine-based materials.

The applicants recently disclosed oxide-based quantum splitting materials. U.S. Pat. No. 5,552,082 discloses a lanthanum magnesium borate activated with $Pr^{3+}$ ion. U.S. Pat. No. 5,571,4151 discloses a strontium magnesium aluminate activated with $Pr^{3+}$ ion and charge compensated with $Mg^{2+}$ ion. Emission spectra of these materials exhibit a large peak at about 405 nm which is characteristic of quantum splitting. However, these materials still exhibit a considerable emission in the UV wavelength range of less than 350 nm. This part of the emission reduces the overall visible light output that otherwise can be higher. Therefore, it is desirable to provide oxide-based quantum-splitting phosphors that have higher quantum efficiency in the visible range than the prior-art quantum splitting materials. It is also desirable to provide more energy-efficient light sources using quantum-splitting phosphors having higher quantum efficiency. It is further desirable to provide method for making materials having high quantum splitting capability.

SUMMARY OF INVENTION

The present invention provides oxide-based phosphors doped with $Pr^{3+}$ ion, which phosphors exhibit quantum splitting when irradiated with VUV radiation. VUV radiation as used herein is radiation having wavelength shorter than about 215 nm. The oxide phosphors of the present invention are oxides of aluminum or boron having positive counterions selected from Group IIA of the Periodic Table. The phosphors of the present invention may be used in mercury vapor discharge lamps to provide energy-efficient light sources.

In one aspect of the present invention, the oxide-based phosphors are strontium or strontium calcium aluminates having the magnetoplumbite crystal structure. The aluminates are doped with $Pr^{3+}$ ion. Furthermore, it is advantageous to substitute some of the aluminum ions with magnesium ions for the purpose of charge compensation when $Pr^{3+}$ is substituted on the $Sr^{2+}$ sites. Such oxide-based phosphors of the present invention have a composition represented by $Sr_{1-1.5y}Pr_yAl_{12}O_{19}$, $Sr_{1-x-1.5y}Ca_xPr_yAl_{12}O_{19}$, or $Sr_{1-x-z}Ca_xMg_zAl_{12-z}Pr_zO_{19}$ where $0<x<1$, $y$ is in the range from about 0.005 to about 0.5, $z$ is in the range from about 0.005 to about 0.5, $x+1.5y \leq 1$, and $x+z<1$.

In another aspect of the present invention, the oxide-based phosphors are calcium or calcium magnesium aluminates activated with $Pr^{3+}$ ion having a composition represented by $Ca_{1-z}Pr_zAl_{12}O_{19}$, $Ca_{1-z}Pr_zMgAl_{11.33}O_{19}$, or $Ca_{1-z}Pr_zMgAl_{14}O_{23}$ where $z$ is in the range from about 0.005 to about 0.5. In all of these host lattices, the $Pr^{3+}$ ion can be charge compensated by the $Mg^+$ ion or by lattice vacancies.

In another aspect of the present invention, the oxide-based phosphors are strontium borate activated with $Pr^{3-}$ having a composition represented by $Sr_{1+z}Pr_zB_4O_7$ where $z$ is in the range from about 0.005 to about 0.5.

The present invention also provides a method of making improved quantum-splitting aluminate or borate phosphors. The method comprises the steps of selecting a desired final composition of the phosphor; mixing together materials from the following two groups: (1) at least one oxygen-containing compound of praseodymium and (2) materials selected from the group consisting of oxygen-containing compounds of strontium, calcium, magnesium, aluminum, and boron so to achieve the desired final composition; forming a substantially homogeneous mixture of the selected compounds; and firing the substantially homogeneous mixture in a non-oxidizing atmosphere at a temperature and for a time sufficient to result in the desired composition and to maintain the praseodymium ion in the 3+ valence state.

In another aspect of the present invention, the method further comprises adding at least one compound selected from the group consisting of fluoride salts of aluminum, calcium, and strontium in a quantity sufficient to act as a flux prior to the step of forming the substantially homogeneous mixture. When the oxide-based phosphor is a borate, a quantity of boric acid may be advantageously used, either in place of or in combination with the fluoride salts, as the flux.

Other benefits of this invention may become evident by a perusal of the description and appended claims together with the attached drawings.

DETAILED DESCRIPTION

In general, the present invention provides oxide-based phosphors activated with $Pr^{3+}$. More particularly, the phosphors are strontium, strontium calcium, strontium calcium magnesium, calcium, calcium magnesium aluminates and strontium borates activated with $Pr^{3+}$ ions. The doping level for $Pr^{3+}$ is typically in the range from about 0.005 to about 0.5.

In one preferred embodiment of the present invention, the aluminate phosphors have a formula of $Sr_{1-1.5y}Pr_yAl_{12}O_{19}$, $Sr_{1-x-1.5y}Ca_xPr_yAl_{12}O_{19}$, or $Sr_{1-x-z}Ca_xMg_zAl_{12-z}Pr_zO_{19}$ where $0<x<1$, y is in the range from about 0.005 to about 0.5, z is in the range from about 0.005 to about 0.5, $x+1.5y \leq 1$, and $x+z<1$. More particularly, phosphors having the quantum-splitting behavior have been made that have composition of $Sr_{0.9}Pr_{0.1}Al_{12}O_{19}$, $Sr_{0.9}Pr_{0.1}Mg_{0.1}Al_{11.9}O_{19}$, and $Sr_{0.725}Ca_{0.175}Pr_{0.1}Al_{11.9}Mg_{0.1}O_{19}$.

In another preferred embodiment of the present invention, the aluminate phosphors have a formula of $Ca_{1-z}Pr_zAl_{12}O_{19}$, $Ca_{1-z}Pr_zMgAl_{11.33}O_{19}$, or $Ca_{1-z}Pr_zMgAl_{14}O_{23}$ where z is in the range from about 0.005 to about 0.5, more preferably from about 0.005 to about 0.2, and most preferably from about 0.005 to about 0.1.

In another preferred embodiment of the present invention, the oxide-based phosphors have a formula of $Sr_{1-z}Pr_zB_4O_7$ where z is in the range from about 0.005 to about 0.5, more preferably from about 0.005 to about 0.2, and most preferably from about 0.005 to about 0.1.

In general, emission spectra of materials exhibiting quantum-splitting capability show a characteristic peak at about 405 nm, which peak is a result of the first visible photon emitted as the excited $Pr^{3+}$ ion radiatively decays from the $^1S_0$ energy level to the $^1I_6$ energy level. Thus, an examination of the intensity-versus-wavelength spectrum provides a convenient way of determining whether a material would be quantum splitting, as opposed to using the more time-consuming measurement of quantum efficiency.

Without limitation, the quantum-splitting behavior of phosphors is attributed to the VUV excitation of the $Pr^{3+}$ ion within the oxide lattice. Therefore, oxides of the present invention should be processed so as to maintain praseodymium as $Pr^{3+}$ ion within the oxide lattice.

Figure 1:
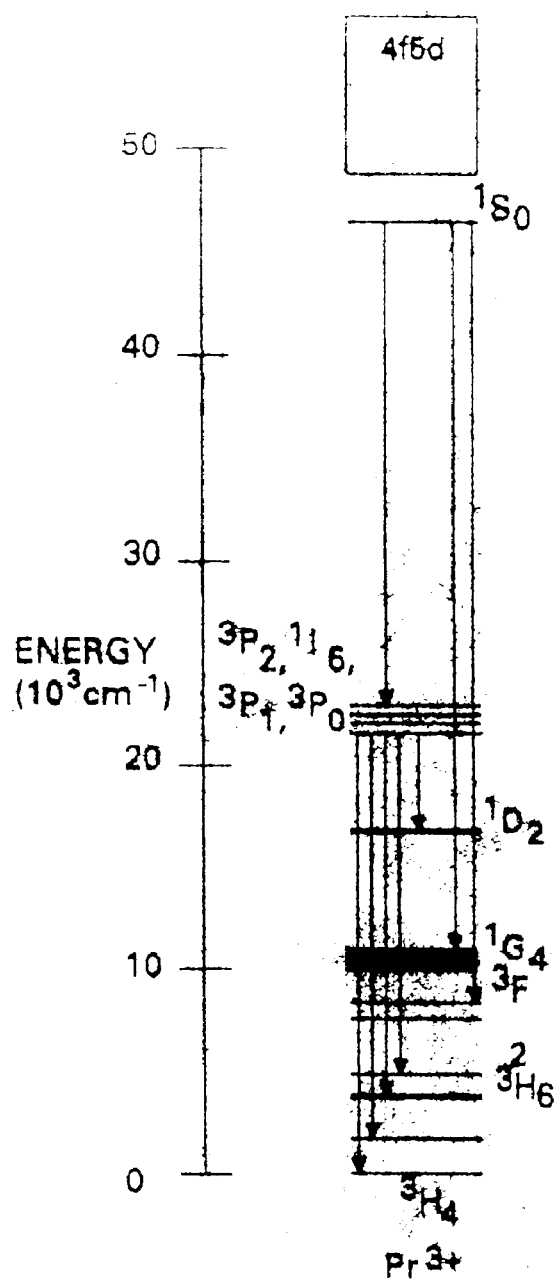
FIG. 1 is a diagram showing energy levels of $Pr^{3+}$ ion.

FIG. 1 shows the energy levels of $Pr^{3+}$ ion. Although the applicants do not wish to be bound by any particular theory, it is believed that the quantum-splitting phosphors of the present invention offer quantum efficiency higher than unity because the $Pr^{3+}$ ion excited by VUV emits two visible photons as it decays back to its ground state through the following process. The excited $Pr^{3+}$ ion in the 4f5d band decays non-radiatively to the $^1S_0$ state from which it radiatively decays to the $^1I_6$ energy level and concurrently emits the first visible photon. The $Pr^{3+}$ then non-radiatively decays from the $^1I_6$ energy level to the $^3P_0$ energy level from which it further radiatively decays to $^3H_4$, $^3H_5$, $^3H_6$, and $^3F_2$ levels and concurrently emits the second visible photon.

EXAMPLE

A calcium magnesium aluminate phosphor of the present invention having the nominal composition $CaMgAl_{11.33}O_{19}:Pr^{3+}$ was produced and tested for quantum-splitting characteristic:Re following amounts of compounds of calcium, praseodymium, magnesium, and aluminum were mixed together thoroughly:

[t1]
1.35 g $CaCO_3$
0.26 g $Pr_6O_{11}$
0.60 g $MgO$
8.66 g $Al_2O_3$

The mixture was fired at 1400° C. for 6 hours in an atmosphere generated by the reaction products of a coconut charcoal and volatized compounds from the decomposition of the oxides and carbonates. The fired material was reblended and further heat-treated at 1100° C. for 6 hours in an atmosphere of 1% (by volume) hydrogen in nitrogen to produce the phosphor.

Figure 2:
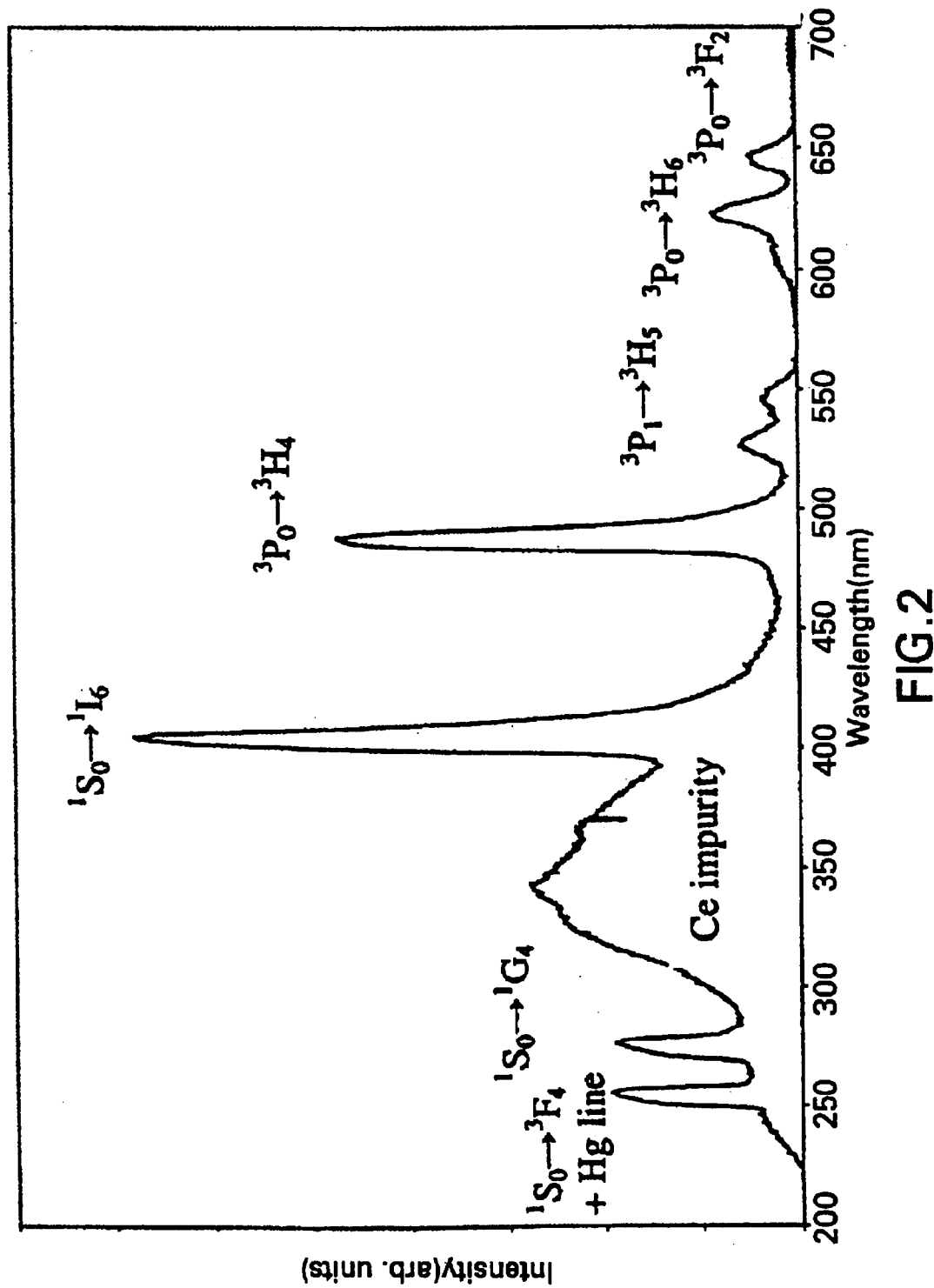
FIG. 2 is an emission spectrum of an aluminate quantum-splitting phosphor of the present invention having the nominal composition of $CaMgAl_{11.33}O_{19}:Pr^{3+}$ where the element following the colons represents the activator doped in the host lattice at a low level.

FIG. 2 shows the room-temperature emission spectrum of this phosphor under a VUV excitation at 185 nm. The spectrum shows a large characteristic peak at about 405 nm of quantum-splitting materials due to the $^1S_0 \rightarrow ^1I_6$ transition of excited $Pr^{3+}$ ions. Other transitions from the $^3P_0$ and $^3P_1$ levels to the $^3H_4$, $^3H_5$, $^3H_6$, and $^3F_2$ levels with the emission of the second visible photon are also evident in the spectrum.

Figure 3:
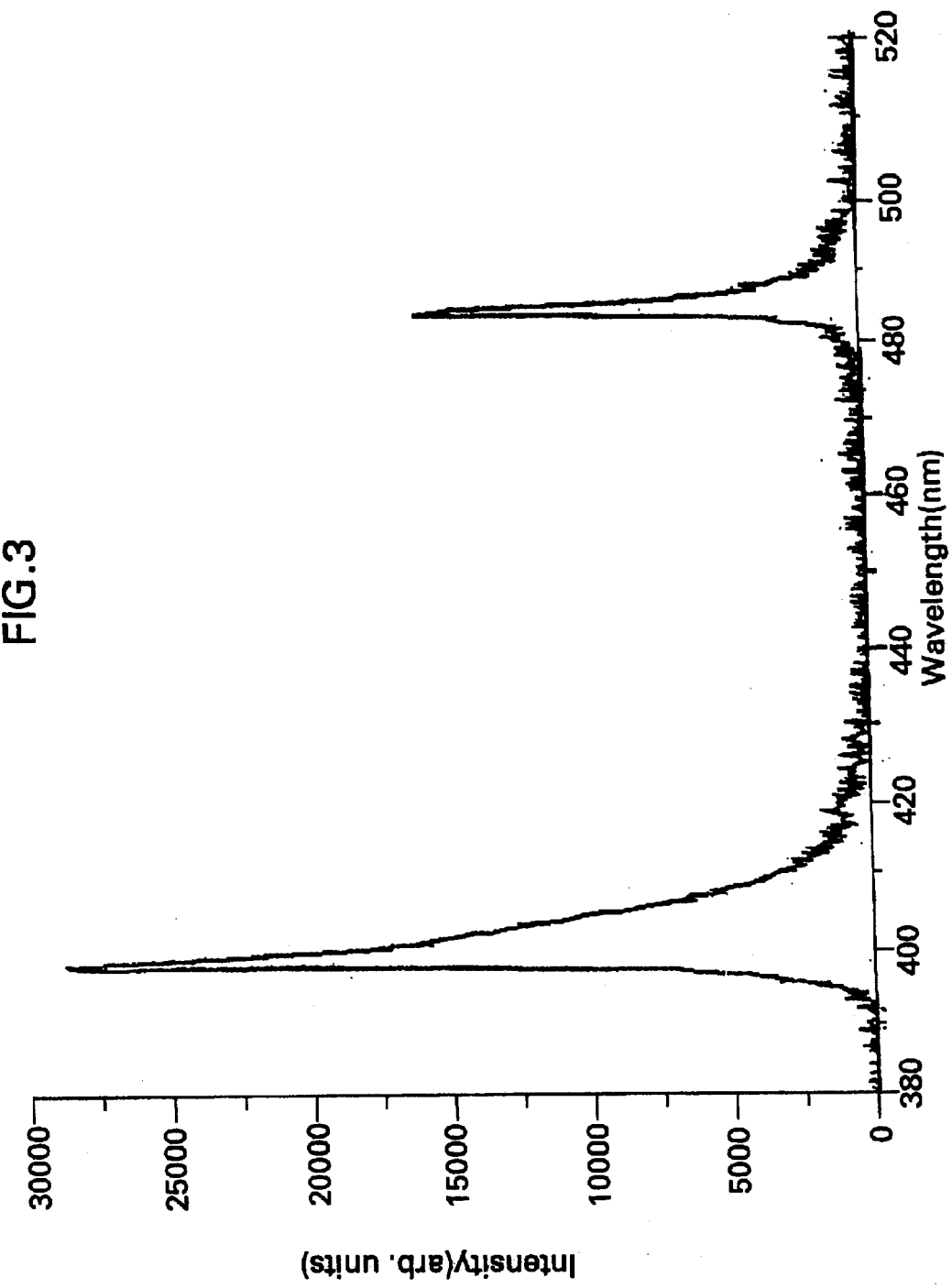
FIG. 3 is an emission spectrum of an aluminate quantum-splitting phosphor of the present invention having the nominal composition of $CaAl_{12}O_{19}:Pr^{3+}$.

FIG. 3 shows the room-temperature emission spectrum of $CaAl_{12}O_{19}:Pr^{3+}$, another exemplary quantum-splitting phosphor of the present invention, under a VUV excitation of 185 nm. The large peak at about 405 nm is characteristic of a quantum-splitting phosphor, exhibiting the the $^1S_0 \rightarrow ^1I_6$ transition of excited $Pr^{3+}$ ions.

Figure 4:
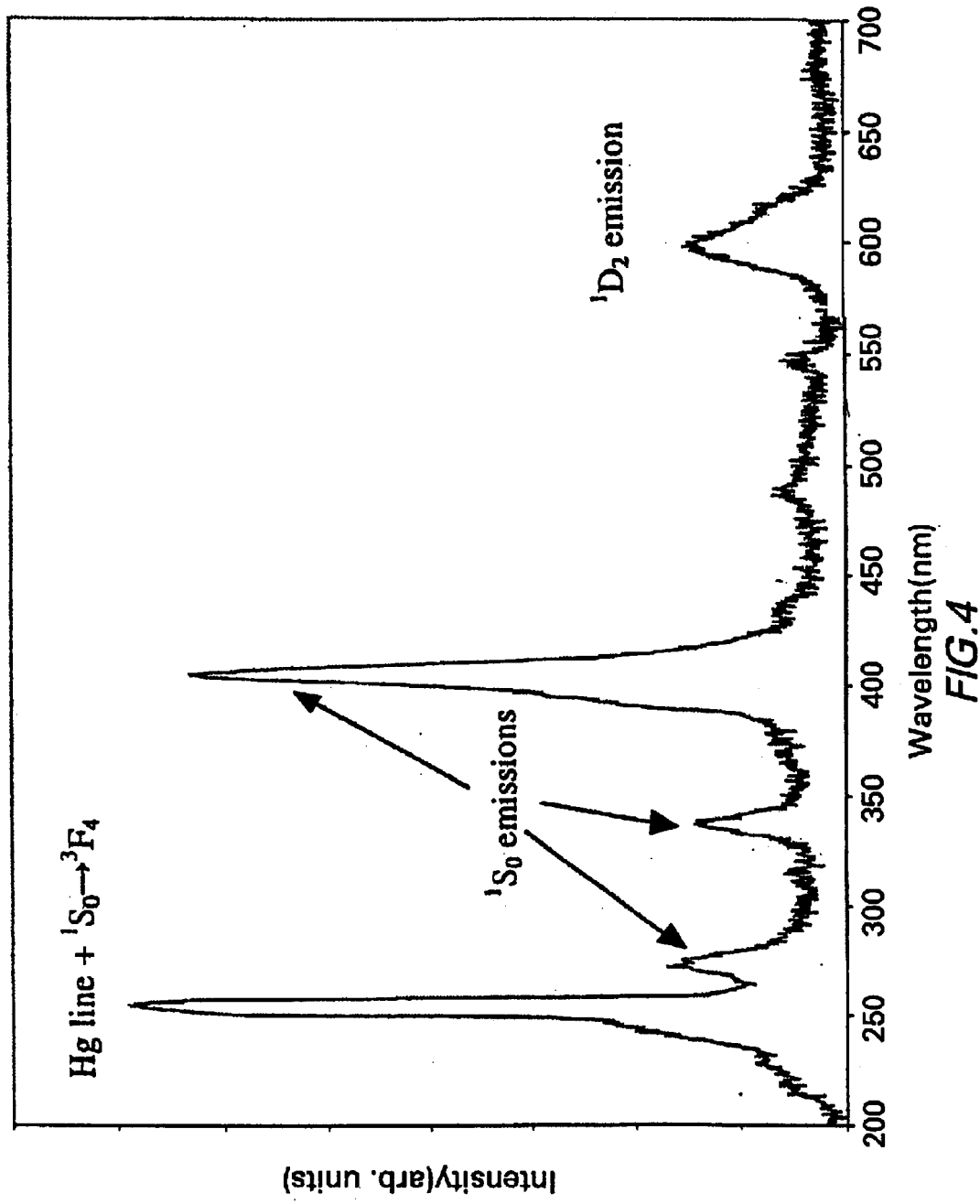
FIG. 4 is an emission spectrum of a borate quantum-splitting phosphor of the present invention having the nominal composition of $SrB_4O_7:Pr^{3+}$.

FIG. 4 shows the room-temperature emission spectrum of a strontium borate quantum-splitting phosphor of the present invention having the composition of $Sr_{0.99}Pr_{0.01}B_4O_7$ under a VUV excitation of 185 nm. The spectrum shows a large characteristic peak at about 405 nm of quantum-splitting materials due to the $^1S_0 \rightarrow ^1I_6$ transition of excited $Pr^{3+}$ ions. This phosphor shows an intense emission at about 252 nm due to the $^1S_0 \rightarrow ^1F_4$ transition. Thus, this or other similar phosphors may be used advantageously to produce more energy-efficient mercury discharge lamps. Specifically, this quantum-splitting phosphor absorbs energy of the 185-nm mercury emission and emits energy at about 252 nm, which in turn is absorbed efficiently by conventional phosphors to produce visible light. Thus, the heretofore-wasted energy of the 185-nm mercury emission is converted usefully to visible light with the result of higher luminous output.

According theoretical considerations (R. Pappalardo, "Calculated Quantum Yields for Photon-Cascade Emission (PCE) for $Pr^{3+}$ and $Tm^{3+}$ In Fluoride Hosts," 14 J. Luminescence 159–193 (1976), incorporated herein as reference) the ratio $\Omega_4/\Omega_6$ of the Judd-Ofelt parameters should be as small as possible in order to achieve a high quantum efficiency from quantum-splitting materials. In the ideal case, this ratio should be zero. This ratio can be estimated by determining the ratio $I(^3P_0 \rightarrow ^3H_4)/I(^3P_0 \rightarrow ^3H_6)$ where $I(^3P_0 \rightarrow ^3H_4)$ and $I(^3P_0 \rightarrow ^3H_6)$ are the intensities of emission from the transitions $^3P_0 \rightarrow {}^3H_4$ and $^3P_0 \rightarrow {}^3H_6$, respectively. The applicants discovered that this ratio decreases when aluminum fluoride was used as a flux during the preparation of the phosphor or when $Mg^{2+}$ or $Ca^{2+}$ is incorporated in the host lattice. $Mg^{2+}$ is preferably incorporated at the aluminum site in the host lattice when $Pr^{3+}$ is substituted for $Sr^{2+}$. Table 1 shows the effect of these modifications to an aluminate host lattice in which the emission is in response to an excitation with radiation having a wavelength of 446 nm.

TABLE 1

| Composition | $I(^3P_0 \rightarrow {}^3H_4)/I(^3P_0 \rightarrow {}^3H_6)$ |
| --- | --- |
| $Sr_{0.9}Pr_{0.1}Al_{12}O_{19}$ | 2.11 |
| $Sr_{0.9}Pr_{0.1}Al_{11.9}Mg_{0.1}O_{19}$ | 1.99 |
| $Sr_{0.9}Pr_{0.1}Al_{11.9}Mg_{0.1}O_{19}$ using a 2% $AlF_3$ flux | 1.85 |
| $Sr_{0.725}Ca_{0.175}Pr_{0.1}Al_{11.9}Mg_{0.1}O_{19}$ | 1.82 |

Although the applicants do not wish to be bound by any particular theory, it is believed that the fluoride ion in the flux substituted for some of the oxygen ions. Therefore, it is expected that any fluoride salt would offer the desired effect. For example, calcium, magnesium, or strontium fluoride also would be effective. Furthermore, these fluorides have the additional benefit of providing some of the desired cations for the host lattice synthesis.

A quantum-splitting phosphor of the present invention is made in a process comprising the steps of; (1) selecting the desired final composition of the phosphor such that the phosphor is activated by praseodymium; (2) mixing together at least oxygen-containing compound of praseodymium and materials selected from the group consisting of oxygen-containing compounds of strontium, calcium, aluminum, boron, and magnesium in quantities so as to achieve the desired final composition of the phosphor; (3) forming a homogeneous mixture of the selected compounds; and (4) firing the homogeneous mixture in a non-oxidizing atmosphere at a temperature and for a time sufficient to result in the desired composition and to maintain the praseodymium ion in the 3+ valence state. The oxygen-containing compounds used in the process may be selected from the group consisting of oxides, carbonates, nitrates, sulfates, acetates, citrates, oxalates, and combinations thereof. The oxygen-containing compounds may be in the hydrated or non-hydrated form. In a preferred embodiment, the process further comprises adding an amount of at least one material selected from the group consisting of fluorides of aluminum, calcium, strontium, and magnesium before the step of forming the substantially homogeneous mixture in a quantity sufficient to serve as a flux for the preparation of the oxide-based phosphor. In another preferred embodiment, when the desired phosphor is a borate a quantity of boric acid is added into the mixture as a flux. The non-oxidizing atmosphere is generated from materials selected from the group consisting of carbon monoxide, carbon dioxide, hydrogen, nitrogen, ammonia, hydrazine, amines, and combinations thereof. The firing may be done in any suitable high-temperature equipment in either a batch-wise or a continuous process. The firing may be done isothermally. Alternatively, the process temperature may be ramped from ambient temperature to and then held at the firing temperature. The firing temperature is in the range from about 800° C. to about 2000° C., preferably from about 850° C. to about 1700° C., and more preferably from about 850° C. to about 1400° C. The firing time should be sufficiently long to convert the mixture to the final desired composition. This time also depends on the quantity of materials being processed and the rate and quantity of non-oxidizing materials being conducted through the firing equipment. A typical firing time is less than 10 hours.

Figure 5:
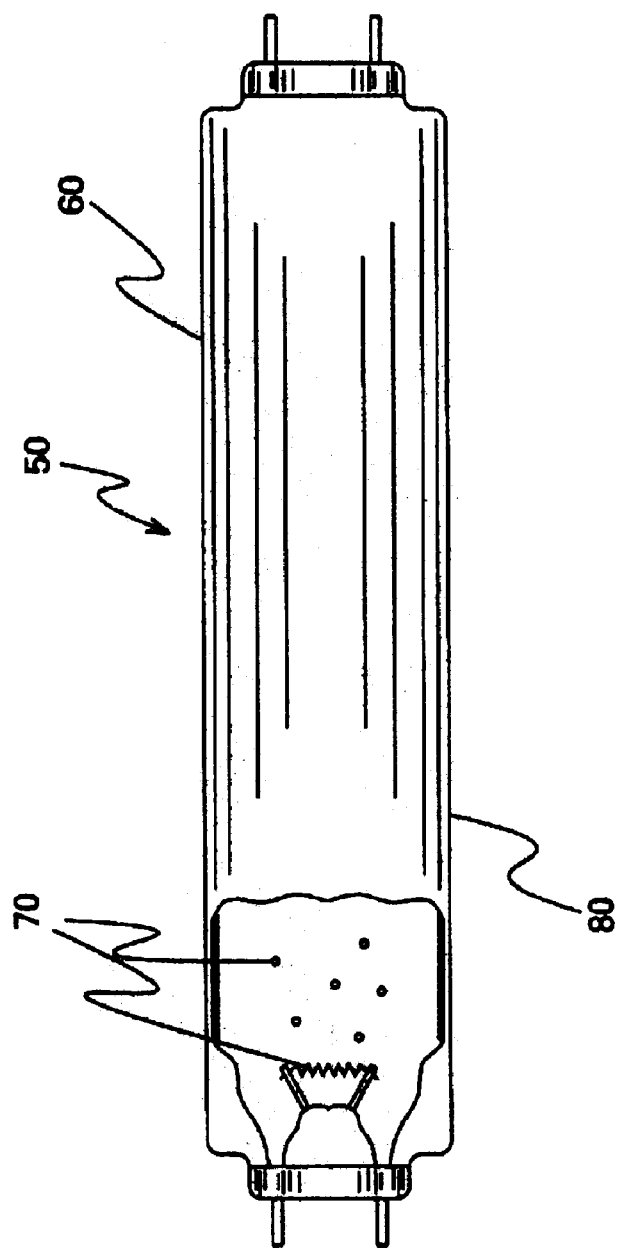
FIG. 5 is a schematic illustration of a lamp incorporating a phosphor of the present invention.

A phosphor of the present invention characterized by quantum-splitting behavior in VUV radiation and stability with regard to an environment in a mercury discharge device may be utilized as a phosphor in a fluorescent lamp. FIG. 5 shows a lamp 50 comprising an evacuated housing 60, a VUV radiation generating means 70 located within housing 60, and a phosphor 80 located within housing 60 and adapted to be excited by VUV radiation. In a preferred embodiment, lamp 50 is a fluorescent lamp and evacuated housing 60 comprises an evacuated glass tube and associated end caps 62. VUV-generating means 70 is a combination of mercury vapor and means for generating high-energy electrons to create a mercury vapor discharge to excite the phosphor. The means for generating high-energy electrons may be a filament of a metal having a low work function, such as tungsten, or such a filament coated with alkali earth metal oxides as are known in the art. The filament is coupled to a high-voltage source to generate electrons from the surface thereof. A quantum-splitting phosphor of the present invention may be used in combination with other conventional phosphors used in fluorescent lighting technology. For example, a quantum-splitting phosphor of the present invention may be combined with conventional red-, green-, and blue-phosphors to produce white light from a mercury discharge lamp. Since the quantum-splitting phosphor of the present invention is transparent to the mercury 254-nm emission line, it may be coated on top of the conventional phosphor layer in the lamp housing so to absorb substantially the mercury 185-nm emission line, thereby increasing the energy efficiency of the discharge lamp.

While specific preferred embodiments of the present invention have been described in the foregoing, it will be appreciated by those skilled in the art that many modifications, substitutions, or variations may be made thereto without departing from the spirit and scope of the invention as defined in the appended claims.

What is claimed is:

1. An oxide-based quantum-splitting phosphor comprising an oxide of aluminum and counterions of calcium and magnesium; said oxide being doped with only $Pr^{3+}$ ion; said $Pr^{3+}$ ion acting as an activator in said phosphor; and said phosphor exhibiting a quantum-splitting behavior when irradiated by VUV radiation.

2. An oxide-based quantum-splitting phosphor having a formula selected from the group consisting of $Sr_{1-1.5y}Pr_yAl_{12}O_{19}$, $Sr_{1-x-1.5y}Ca_xPr_yAl_{12}O_{19}$, and $Sr_{1-x-z}Ca_xMg_zAl_{12-z}Pr_zO_{19}$, wherein $0<x<1$, y is in the range from about 0.005 to about 0.5, z is in the range from about 0.005 to about 0.5, $x+1.5y \leq 1$, and $x+z<1$.

3. An oxide-based quantum-splitting phosphor having a formula selected from the group consisting of $Ca_{1-z}Pr_zAl_{12}O_{19}$, $Ca_{1-z}Pr_zMgAl_{11.33}O_{19}$, and $Ca_{1-z}Pr_zAl_{14}O_{23}$ where z is in the range from about 0.005 to about 0.5.

4. An oxide-based quantum-splitting phosphor having a formula selected from the group consisting of $Ca_{1-z}Pr_zAl_{12}O_{19}$, $Ca_{1-z}Pr_zMgAl_{11.33}O_{19}$, and $Ca_{1-z}Pr_zAl_{14}O_{23}$ where z is in the range from about 0.005 to about 0.5, wherein a charge of host lattice upon incorporating $Pr^{3+}$ ions in said host lattice is compensated by further incorporating $Mg^{2+}$ ions or lattice vacancies in said host lattice.

5. An oxide-based quantum-splitting phosphor having a formula $Sr_{1-z}Pr_zB_4O_7$, wherein z is in the range from about 0.005 to about 0.5.

6. An oxide-based quantum-splitting phosphor comprising an oxide of an element selected from the group consisting of aluminum and boron, and at least one positive counterion selected from the group consisting of strontium, calcium, and magnesium; said oxide being doped with $Pr^{3+}$ ions; said phosphor exhibiting a quantum-splitting behavior when irradiated by VUV radiation; and said phosphor being further doped with fluoride ions.

7. A method of making a quantum-splitting phosphor, said method comprising the steps of: (1) selecting a desired final composition of said phosphor such that said phosphor is activated by praseodymium ion; (2) mixing together: (a) at least one oxygen-containing compound of praseodymium; (b) materials selected from the group consisting of oxygen-containing compounds of strontium, calcium, aluminum, boron, and magnesium; and (c) at least one fluoride selected from the group consisting of fluorides of aluminum, calcium, strontium, and magnesium; (3) forming a substantially homogeneous mixture of said oxygen-containing compounds and said fluoride; and (4) firing said substantially homogeneous mixture in a non-oxidizing atmosphere at a temperature and for a time sufficient to result in said desired final composition and to maintain substantially all of said praseodymium ions in a 3+ valence state.

8. The method of claim 7 wherein said non-oxidizing atmosphere is generated from materials selected from the group consisting of carbon monoxide, carbon dioxide, hydrogen, nitrogen, ammonia, hydrazine, amines, and mixtures thereof.

9. The method of claim 7 wherein said firing is done isothermally at a temperature from about 800° C. to about 2000° C.

10. The method of claim 7 wherein said temperature is in a range from about 850° C. to about 1700° C.

11. The method of claim 10 wherein said firing continues for a time less than about 10 hours.

12. The method of claim 7 wherein said firing is done while said temperature is ramped from ambient to an end temperature in a range from about 850° C. to about 1400° C.

13. The method of claim 12 wherein said firing continues for a time less than about 10 hours.

14. The method of claim 7 wherein said oxygen-containing compounds are selected from the group consisting of oxides, carbonates, nitrates, sulfates, acetates, citrates, oxalates, and combinations thereof.

15. The method of claim 14 wherein said oxygen-containing compounds are selected from the group consisting of compounds in a hydrated form, a non-hydrated form, and combinations thereof.

16. A light source comprising an evacuated housing; a VUV radiation source located within said housing; and a phosphor located within said housing and adapted to be excited by said VUV radiation source; said phosphor comprising an oxide-based quantum-splitting phosphor selected from the group consisting of: (1) a first material which comprises an oxide of aluminum and calcium; said first material being doped with only $Pr^{3+}$; and (2) a second material which comprises an oxide of boron and strontium; said second material being doped with only $Pr^{3+}$; said phosphor exhibiting quantum-splitting behavior when irradiated by VUV.

17. A light source comprising an evacuated housing; a VUV radiation source located within said housing; and a phosphor located within said housing and adapted to be excited by said VUV radiation source; said phosphor comprising an oxide-based quantum-splitting phosphor and having a formula selected from the group consisting of $Sr_{1-1.5y}Pr_yAl_{12}O_{19}$, $Sr_{1-x-1.15y}Ca_xPr_yAl_{12}O_{19}$, and $Sr_{1-x-z}Ca_xMg_zAl_{12-z}Pr_zO_{19}$, wherein 0<x<1, y is in the range from about 0.005 to about 0.5, z is in the range from about 0.005 to about 0.5, x+1.5y≦1, and x+z<1.

18. A light source comprising an evacuated housing; a VUV radiation source located within said housing; and a phosphor located within said housing and adapted to be excited by said VUV radiation source; said phosphor comprising an oxide-based quantum-splitting phosphor and having a formula selected from the group consisting of $Ca_{1-z}Pr_zAl_{12}O_{19}$, $Ca_{1-z}Pr_zMgAl_{11.33}O_{19}$, and $Ca_{1-z}Pr_zMgAl_{14}Pr_zO_{23}$ where z is in the range from about 0.005 to about 0.5.

19. A light source comprising an evacuated housing; a VUV radiation source located within said housing; and a phosphor located within said housing and adapted to be excited by said VUV radiation source; said phosphor comprising an oxide-based quantum-splitting phosphor and having a formula of $Sr_{1-z}Pr_zB_4O_7$, wherein z is in a range from about 0.005 to about 0.5.

20. The light source of claim 16 further comprising phosphors that emit at least one radiation selected from the group consisting of red, green, and blue visible radiation when excited by a UV radiation.

21. A light source comprising an evacuated housing; a VUV radiation source located within said housing; and a phosphor located within said housing and adapted to be excited by said VUV radiation source; said phosphor comprising an oxide-based quantum-splitting phosphor selected from the group consisting of: (1) a first material which comprises an oxide of aluminum and calcium; said first material being doped with only $Pr^{3+}$; and (2) a second material which comprises an oxide of boron and strontium; said second material being doped with only $Pr^{3+}$; said phosphor exhibiting quantum-splitting behavior when irradiated by VUV; said light source further comprising phosphors that emit at least one radiation selected from the group consisting of red, green and blue visible light.

22. An oxide-based quantum-splitting phosphor having a formula of $CaAl_{12}O_{19}:Pr^{3+}$.

23. An oxide-based quantum-splitting phosphor having a formula of $SrB_4O_7:Pr^{3+}$.

24. An oxide-based quantum-splitting phosphor consisting of an oxide of boron and counterions of strontium; said oxide being doped with $Pr^{3+}$ ions, and said phosphor exhibiting a quantum splitting behavior when irradiated by VUV radiation.

25. An oxide-based quantum splitting phosphor consisting of an oxide of aluminum and counterions of strontium, calcium, and magnesium; said oxide being doped with $Pr^{3+}$ ions; and said phosphor exhibiting quantum splitting behavior when irradiated by VUV radiation.

* * * * *